United States Patent [19]

Tabata et al.

[11] 4,354,187

[45] Oct. 12, 1982

[54] ELECTROCHROMIC DISPLAY DEVICE

[75] Inventors: Junichi Tabata; Noboru Kaneko, both of Tokyo, Japan

[73] Assignee: Kabushiki Kaisha Daini Seikosha, Tokyo, Japan

[21] Appl. No.: 168,318

[22] Filed: Jul. 10, 1980

[30] Foreign Application Priority Data

Jul. 17, 1979 [JP] Japan ................... 54-090737

[51] Int. Cl.³ ............................. G09G 3/16
[52] U.S. Cl. ........................... 340/763; 340/785; 340/713; 350/357
[58] Field of Search ............ 340/763, 785, 713; 350/357

[56] References Cited

U.S. PATENT DOCUMENTS

| | | | |
|---|---|---|---|
| 4,167,308 | 9/1979 | Barclay et al. | 350/357 |
| 4,229,080 | 10/1980 | Take et al. | 340/785 X |
| 4,256,380 | 3/1981 | Barclay et al. | 340/785 X |

Primary Examiner—David L. Trafton
Attorney, Agent, or Firm—Robert E. Burns; Emmanuel J. Lobato; Bruce L. Adams

[57] ABSTRACT

An electrochromic display device comprising a display electrode group, a refresh electrode and a counter electrode, is driven by an electric charge transmisson method.

Initially the coloration electric charge is injected into some of the display electrodes from the counter electrode. Thereafter the stored coloration electrode charge is cyclically transmitted among the display electrode group to display a variant pattern. The repeat of the transmission causes deterioration of an amount of the coloration electric charge. In order to compensate a lack of the amount of the coloration electric charge, periodically a coloration electric charge is injected into the refresh electrode from the counter electrode. Then the newly added coloration electric charge is transmitted into the display electrode group to maintain display contrast.

4 Claims, 6 Drawing Figures

ELECTROCHROMIC DISPLAY DEVICE

BACKGROUND OF THE INVENTION

The present invention relates to an electrochromic display device (referred to as an ECD hereafter). More particularly, the present invention relates to a refreshing method of coloration degree in an ECD which is driven by transmitting a coloration electric charge kept by an electrode group in a coloration state to an electrode group in a bleaching state, by applying a voltage between the electrode group in the coloration state and the electrode group in the bleaching state (referred to as an electric charge transmission drive). The ECD driven by the electric charge transmission is excellent in uniformity in display color and a quick response. FIG. 1 shows a schematic illustration of an ECD panel for explaining the charge transmission drive.

In the ECD panel, transparent electrodes 2a and 2c are formed on a plane of a transparent substrate 1 by evaporating $In_2O_3$ or the like, and films of electrochromic material 3a to 3c are formed on the transparent electrodes 2a to 2c in the configuration of display picture elements by evaporating $WO_3$ or $MoO_3$.

Though omitted in FIG. 1, the transparent electrode portion other than the display picture element pattern region is covered with an insulating film. The transparent electrodes 2a to 2c and the films of electrochromic material 3a to 3c are designated generally as display electrodes A to C. An electrolyte 7 is sealed within spacers 6 placed between the substrate 1 and a substrate 4 on which a counter electrode 5 formed by Au or the like is provided. The electrolyte is mixed with a white powder such as $TiO_2$ to constitute a background of the display.

Referring to the circuit portion, coloration switches 8a to 8c respectively connect each of the transparent electrodes 2a to 2c to the cathode of a battery 12. Bleaching switches 9a to 9c, respectively connect each of the transparent electrodes 2a to 2c to the anode of the battery 12. A switch 10 for eliminating the coloration electric charge connects the counter electrode 5 to the cathode of the battery 12. A switch 11 for injecting the coloration electric charge connects the counter electrode 5 to the anode of the battery 12.

Now the operation of the ECD by the above described structure will be illustrated.

The coloration electric charge is first injected into the ECD panel. The electrode to which the coloration electric charge is injected initially is designated as the display electrode A. When the switch 8a and the switch 11 are closed, a current flows from the counter electrode 5 to the display electrode A, and the film of the electrochromic material 3a is deoxidized and colored. After the film of the electrochromic material 3a reaches the predetermined coloration degree, the switches 8a and 11 are opened. Then the electrochromic material 3a keeps the deoxidization state and the display memorizes the coloration state.

Referring next to the method of the electric charge transmission, the coloration electric charge kept in the display electrode A is transmitted to the display electrode C by closing the switches 9a and 8c and connecting the cathode of the battery 12 to the display electrode A and connecting the anode of the battery 12 to the display electrode C. At this time the coloration electric charge is released from the display electrode A, transmitted through the electrolyte 7 and injected to the display electrode C. As a result, the display electrode A changes from the coloration state to the bleaching state and the display electrode C assumes the coloration state and the display state changes.

The above noted electric charge transmission drive is disadvantageous in that the coloration degree deteriorates with an increase in the number of transmissions, since a slight transmission loss exists in the electric charge transmission.

FIG. 2 shows an experimental data of the coloration degree and the number of transmissions. The ordinate indicates a reflection rate of the display portion and the abscissa indicates the number of transmissions in FIG. 2. The white background is the standard of 100% reflection rate, and the more the coloration degree, the less the reflection rate. FIG. 2 teaches that the coloration degree is substantially constant until the number of transmissions is $10^3$ times, and thereafter the coloration degree abruptly deteriorates. Therefore a difference in the coloration degree, i.e., a color shading appears between the display electrode group of large number of the electric charge transmission and the display electrode group of small number of the electric charge transmission, or the coloration degree of the display gradually deteriorates as a whole.

SUMMARY OF THE INVENTION

It is an object of the present invention to eliminate the drawbacks illustrated so far and to fix the coloration degree of the display by supplementing and refreshing the electric charge to the display electrode group in which the coloration degree is deteriorated, until the electric charge of the display electrode group reaches the predetermined amount.

Another object of the present invention is to provide an improved electrochromic display device comprising a display electrode group, a counter electrode and a refresh electrode.

Other and further objects, features and advantages of the present invention will appear more fully from the following description.

DETAILED DESCRIPTION OF THE INVENTION

Figure 1:
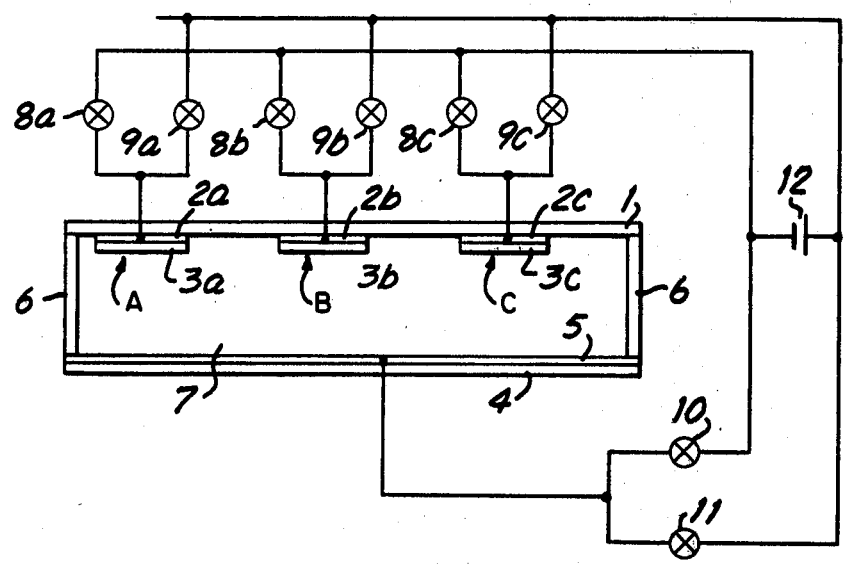
FIG. 1 shows an ECD for illustrating the fundamental principle of an electric charge transmission.
Figure 2:
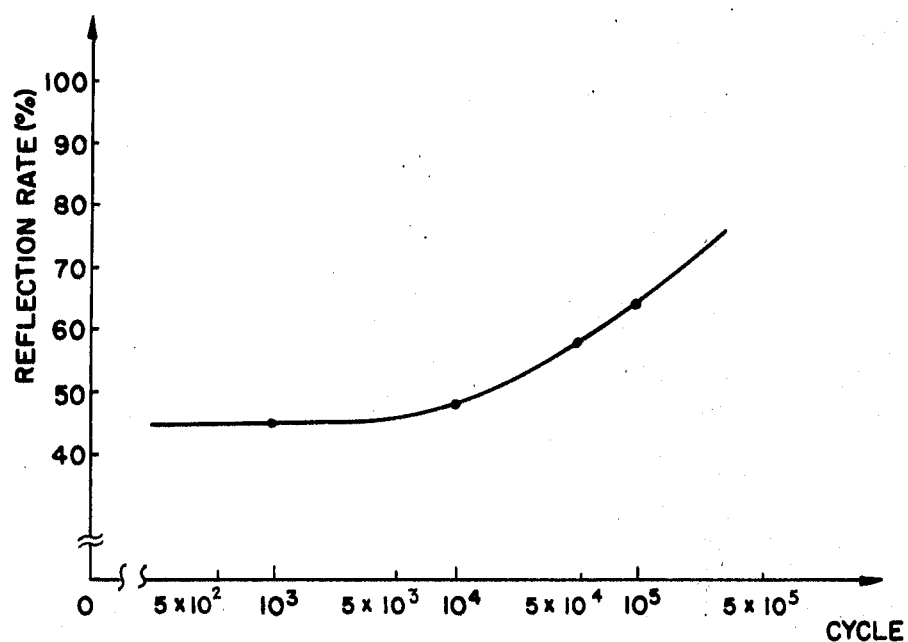
FIG. 2 shows the relationship between the number of transmissions and the reflection rate.
Figure 3:
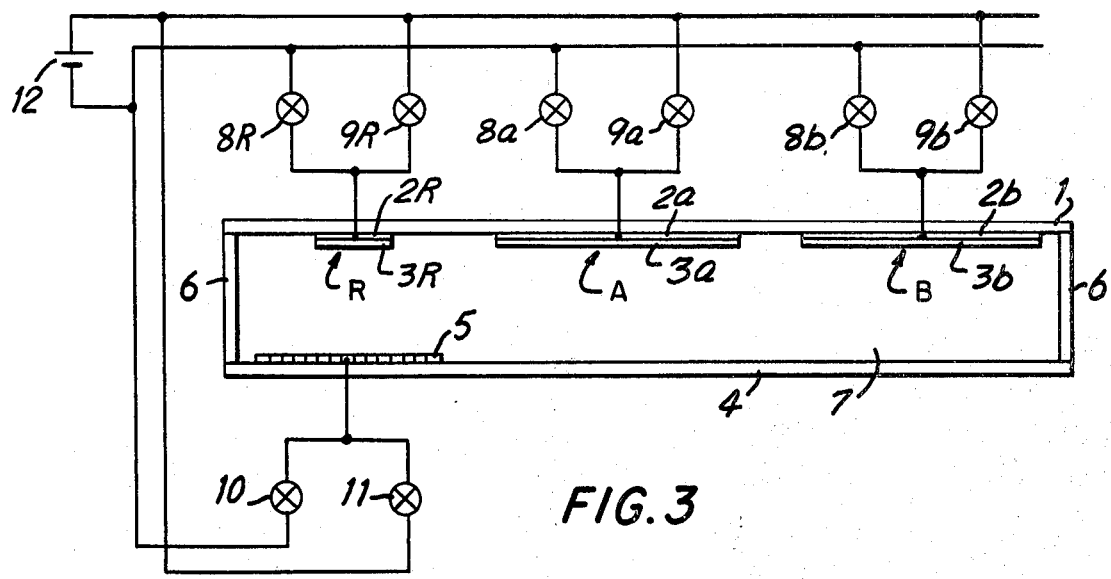
FIG. 3 shows an ECD provided with a refresh electrode.

FIG. 3 shows an ECD provided with a refresh electrode according to the present invention. In FIG 3, the same portions as that of FIG. 1 are designated by the same references as that of FIG. 1 and the description therefor will be omitted.

A refresh electrode R consists of a transparent electrode 2R on a plane of the transparent substrate 1 and a film of electrochromic material 3R provided on the transparent electrode 2R. It is desirable for elongating the life of the display that the material of the transparent electrode 2R and the film of electrochromic material 3R be the same as the material of the transparent electrodes 2a to 2c inclusive and the film of the electrochromic materials 3a to 3c inclusive.

The refresh electrode R according to the present invention consists of the transparent electrode 2R and the film of electrochromic material 3R made of the same material as the display electrode group (the display electrodes A, B, . . . ).

The refreshing method in the ECD of the above described structure will be illustrated hereinafter.

The coloration electric charge on the display electrode is refreshed by flowing a current between the counter electrode 5 and the refresh electrode R. The refresh cannot be carried out even if the current flows between the display electrodes since the maintained coloration electric charge is simply transmitted and the electric charge for refreshing is not injected from outside. Therefore the refresh of the coloration electric charge of the display electrode A is required since the coloration degree is deteriorated as explained hereafter:

1. The switches 9a and 8R are closed at the time the display electrode A is bleached to transmit the coloration electric charge on the display electrode A to the refresh electrode R. As the result, the display electrode A is in the bleaching state.
2. The switches 9a and 8R are opened to hold the coloration electric charge on the refresh electrode R.
3. The switches 9R and 10 are closed to eliminate the coloration electric charge on the refresh electrode R. After this the switches 9R and 10 are opened.
4. The switches 8R and 11 are closed to inject the coloration electric charge corresponding to the predetermined coloration degree on the refresh electrode R. After this the switches 8R and 11 are opened.
5. The switches 8a and 9R are closed at the time the display electrode A is colored to transmit the coloration electric charge on the refresh electrode R to the display electrode A.

The refresh of the coloration electric charge on the display electrode A is finished by the above 1 through 5 operations.

Although in the above description the coloration electric charge is restored to the display electrode A after refreshing, it is possible that the coloration electric charge may be transmitted to the other display electrode which change from the bleaching state to the coloration state. In this case the deterioration of the coloration degree and the color shading are also prevented by refreshing the coloration electric charge at the predetermined amount of the electric charge.

Although the coloration electric charge to be refreshed is once eliminated in the above description, it is possible to supplement the deficiency of the coloration electric charge without eliminating the coloration electric charge to be refreshed. In this case the operation 3 is omitted.

Subsequently a method to set the coloration degree on refreshing according to the present invention will be illustrated.

Variation of the amount of the injection electric charge on refreshing causes nonuniformity of the coloration degree and deteriorates the quality of the display. Accordingly it is desirable that the amount of the injection electric charge on refreshing be fixed at a constant value. The present invention takes into account the fixing of the amount of the injection electric charge. Now a refreshing method to fix the amount of the injection electric charge and the coloration degree on refreshing will be illustrated.

Figure 4:
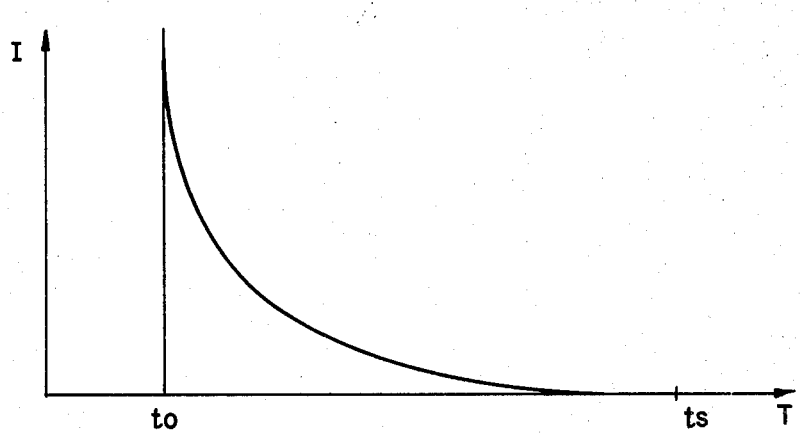
FIG. 4 shows a refresh current waveform.

If the time for injecting the coloration electric charge is settled sufficiently long in the refreshing operation 4, the amount of the injection electric charge is saturated. FIG. 4 shows a waveform chart of the refreshing current. The ordinate designates a current value and the abscissa designates a time for injecting the coloration electric charge. The refreshing current is at a peak at the start of injection ($t_0$) and gradually reduces with the passage of the injection time and the current flow stops after the time $t_s$. So the amount of the injection electric charge is saturated after the time $t_s$, provided that the saturation time ($t_s$- $t_0$) has temperature dependency.

Namely, it has been experimentally confirmed that the saturation time becomes longer with a drop in temperature but the amount of the injection electric charge is substantially fixed. Therefore, if the time for injecting the coloration electric charge is set longer than the maximum saturation time at low temperature, the amount of the injection electric charge and the coloration degree are fixed constantly on refreshing, according to the experiment.

Although the object of the invention to fix the amount of the injection electric charge can be attained by the above electric charge injecting method, the following drawback occurs. Namely the coloration degree is too high if the injection electric charge is transmitted to the display electrode as it is since the amount of the injection electric charge is controlled by the saturation, and the quality of the display thus becomes deteriorated.

Therefore, in one embodiment of the present invention, the area of the refresh electrode is set smaller than the area of the display electrode so that a display at the predetermined coloration degree is carried out on the display electrode in order to solve the above described drawback. The drawback is solved in the following manner. Namely, if the coloration electric charge injected on the refresh electrode R is transmitted to the display electrode A having a larger area than that of the refresh electrode, the density of the coloration electric charge deteriorates on the display electrode A compared with the density of the coloration electric charge on the refresh electrode R and hence the coloration degree also deteriorates. Accordingly the refresh is carried out stably at the predetermined coloration degree by setting the area of the refresh electrode R smaller than that of the display electrode and selecting both areas suitably.

The refreshing method of the coloration degree according to the present invention has been illustrated in conjunction with FIGS. 3 and 4.

Figure 5:
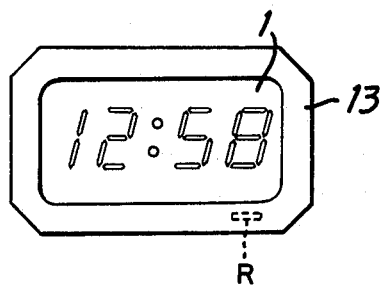
FIG. 5 shows one embodiment of an ECD according to the present invention.

FIG. 5 shows another embodiment of the present invention, in which an ECD is provided with a cover plate above the refresh electrode R, and in which an oblique line portion denotes a cover plate. The cover plate 13 is provided on the reverse surface of the transparent substrate 1 where the refresh electrode is provided so as to cover and mask the refresh electrode R from the outside.

The cover plate 13 is easily provided on the transparent substrate 1 by printing and the like.

Figure 6:
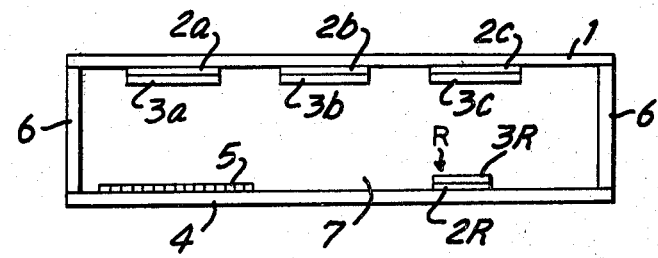
FIG. 6 shows another embodiment of an ECD according to the present invention.

FIG. 6 shows another embodiment of the present invention, in which an ECD is provided with the refresh electrode R on the substrate 4 on which the counter electrode 5 is provided. In this embodiment, since the refresh electrode R is masked from the outside by white powder such as $T_iO_2$, mixed in the electrolyte 7, it is not necessary to provide the mask for the refresh electrode and so the design variety of the ECD is extended.

As illustrated so far, the present invention has the following effects:

(1) The display electrode can be controlled at a fixed coloration degree constantly since the refresh is carried out taking advantage of the saturation of the coloration electric charge caused by a spontaneous stop of the refresh current between the refresh electrode and the counter electrode.

(2) The predetermined coloration degree can be reproduced on the display electrode by setting the area of the refresh electrode smaller than that of the display electrode.

Consequently, the deterioration of the coloration degree of the ECD caused by the electric charge transmission drive and the color shading between the display electrodes of the different number of transmissions can be compensated correctly and reproducibly so that an ECD of excellent display quality can be provided.

What is claimed is:

1. An electrochromic display device comprising:

a display electrode group comprised of transparent electrodes have electrochromic layers formed on the transparent electrodes and being divided into a coloration display electrode and a bleaching display electrode;

a counter electrode;

a refresh electrode operable to maintain the coloration degree of the coloration display electrode at a constant level and connected to receive electric charge from the counter electrode;

means for applying a voltage between the refresh electrode and the counter electrode till the current flow between the refresh electrode and the counter electrode is saturated;

means for applying a voltage between the coloration display electrode and the bleaching display electrode to change the display state; and means for applying a voltage between the refresh electrode and the coloration display electrode.

2. A method for driving an electrochromic display device having transparent electrodes, a plurality of display electrodes having a coloration display electrode and consisting of electrochromic layers formed on the transparent electrodes, and a counter electrode, the method comprising the steps of: injecting an electric charge from the counter electrode to a refresh electrode; continuing the injecting of electric charge to the refresh electrode till the current flow of electric charge from the counter electrode to the refresh electrode is saturated; and thereafter transferring the electric charge from the refresh electrode to the coloration display electrode.

3. In an electrochromic display device having a plurality of display electrodes having bleached and colored states and operable when a voltage is applied between groups of display electrodes in the colored and bleached states to transfer electric charges through an electrolyte from the colored display electrode group to the bleached display electrode group to thereby change the display state of the electrochromic display device: a counter electrode in contact with the electrolyte; a refresh electrode in contact with the electrolyte; means for applying a voltage between the refresh and counter electrodes until the current flow of electric charges between the refresh electrode and the counter electrode becomes saturated; and means for applying a voltage between the refresh electrode and the display electrodes which are in the colored state to maintain the coloration degree of the colored display electrodes at a constant level.

4. An electrochromic display device according to claim 1 or 3; wherein the surface area of the refresh electrode is smaller than that of the display electrodes.

* * * * *